United States Patent [19]

Hurlbut, Sr. et al.

[11] 3,757,498
[45] Sept. 11, 1973

[54] DEMISTER VANE ASSEMBLY

[75] Inventors: William B. Hurlbut, Sr., East Hartford; Preston D. Liebig, West Hartford; Peter G. Maurin, Newington, all of Conn.

[73] Assignee: Combustion Engineering Inc., Windsor, Conn.

[22] Filed: Aug. 5, 1971

[21] Appl. No.: 169,393

[52] U.S. Cl.................... 55/440, 55/257, 55/443, 55/DIG. 37
[51] Int. Cl............................................. B01d 45/00
[58] Field of Search............. 55/257, 440, 442–446, 55/436, DIG. 37, 435, 464; 261/DIG. 11

[56] References Cited
UNITED STATES PATENTS

| | | | |
|---|---|---|---|
| 2,583,171 | 1/1952 | Green et al. | 55/444 X |
| 2,785,768 | 3/1957 | Gauchard | 55/464 X |
| 2,252,242 | 8/1941 | Wood | 55/440 X |
| 2,962,122 | 11/1960 | Linderoth | 55/DIG. 37 X |
| 3,348,466 | 10/1967 | Lane et al. | 55/257 X |
| 3,566,585 | 3/1971 | Voloshen et al. | 55/435 |

Primary Examiner—Frank W. Lutter
Assistant Examiner—William Cuchlinski, Jr.
Attorney—Eldon H. Luther, Richard H. Berneike et al.

[57] ABSTRACT

A demister vane assembly particularly resistant to corrosion and capable of interchangeable organization into a multiplicity of area and geometrical configuration arrangements. The demister vane assembly is formed in a standardized shape of a reinforced plastic capable of withstanding the thermal and chemical environment of a wet scrubber system. The standardized shape is a flow diverting surface preferably formed as a Z-shaped vane having end platforms angled approximately 60° to the longitudinal axis of the vane, the platforms having lap joint shoulders and self-fixturing segments. By means of the standardized shape, the vanes may be arranged, both end to end as well as side by side, to yield any desired demister area and geometrical configuration.

6 Claims, 6 Drawing Figures

PATENTED SEP 11 1973

INVENTORS
PRESTON LIEBIG
WILLIAM B. HURLBUT
PETER G. MAURIN
BY Lawrence P. Kessler
ATTORNEY

INVENTORS
PRESTON LIEBIG
WILLIAM B. HURLBUT
PETER G. MAURIN

BY *Lawrence P. Kessler*

ATTORNEY

3,757,498

DEMISTER VANE ASSEMBLY

BACKGROUND OF THE INVENTION

One of the foremost problems which confronts mankind today is that of air pollution. This problem is accentuated by the fact that to some degree nearly all industrial and commercial activities emit pollutants of the air. These air pollutants fall into three major categories: particulate matter, gaseous pollutants and odor. One of the primary contributions to air pollution occurs with the combustion of fossil fuels for the purpose of power generation. Combustion gases contain both particulate matter and certain gaseous compounds which are generally injurious to health and damaging to physical property.

A system has been developed to substantially reduce both the particulate matter and the toxic gases contained in the flue gases resulting from the fossil fuel combustion process. This system involves the feeding of an alkaline earth additive to the furnace and wet scrubbing the flue gases. The pulverized additive fed to the furnace is calcined producing a more reactive compound. The calcined particles react with the combustion gases to form compounds of calcium and magnesium (removing a large percent of sulfur oxides from the gas) which are scrubbed from the flue gas in a wet scrubber. The flue gas containing the unreacted sulfates and calcined additive also passes into the wet scrubber wherein the calcined additive that is not combined with the sulfate in the furnace reacts with the water and the remaining sulfate to form sulfates and sulfites of calcium and magnesium which are also scrubbed from the gas. Additionally, the water serves to entrain the fly ash, resulting in particulate matter removal due to the washing action within the scrubber. The cleansed flue gases then pass through a demister for removal of the remaining water in the gas.

Design of the demister for the wet scrubber system has presented some unique problems. This is due to the fact that the demister must efficiently remove as much water as possible from the gas stream flowing through the scrubber, the water being taken from the line of the gas stream without dumping it back into the stream as the gases pass through the scrubber bed into the demister. The very action of water collection which the demister is to provide, however, promotes deposit build-up and fouling of the demister with corrosive products. Additional design problems arise due to the infinite variety of areas and geometrical configurations required of the demister depending on the size and capacity of the particular scrubber system in question.

SUMMARY OF THE INVENTION

There is herein provided a demister vane assembly which serves efficiently to remove water from the flue gas stream, is not subject to corrosive fouling, and is capable of interchangeable formation into a multiplicity of size and shape arrangements. The vane assembly is formed in a standardized shape of a reinforced plastic capable of withstanding the thermal and chemical environment of a wet scrubber system. The standardized shape is a flow diverting surface preferably formed as a Z-shaped vane having end platforms angled approximately 60° to the longitudinal axis of the vane, the platforms having lap joint shoulders and self-fixturing segments. By means of the standardized shape, the vanes may be arranged, both end to end as well as side by side, to yield any desired demister area and geometrical configuration.

DESCRIPTION OF THE PREFERRED EMBODIMENT

Figures 1, 2:
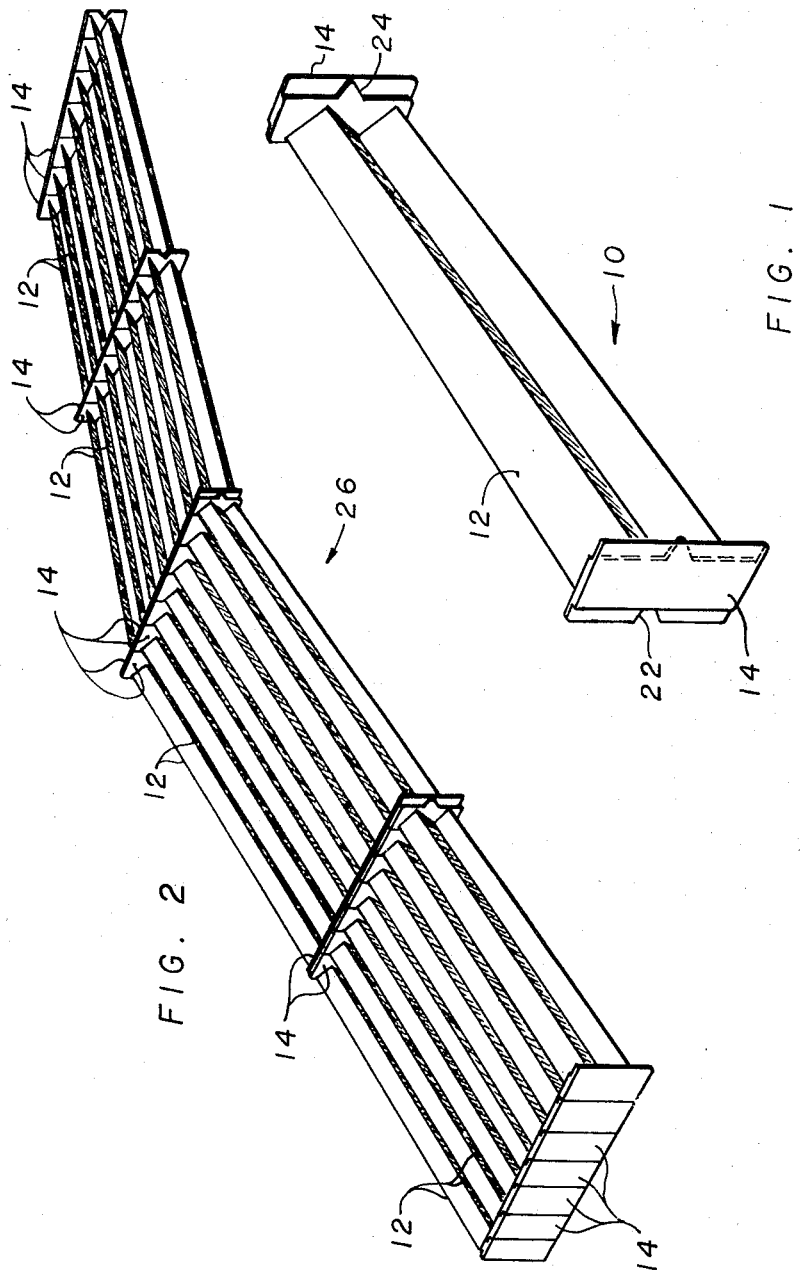
FIG. 1 is a perspective view of a demister vane assembly according to this invention.
FIG. 2 is a perspective view of a demister arrangement incorporating the vane assemblies of this invention.
Figure 3:
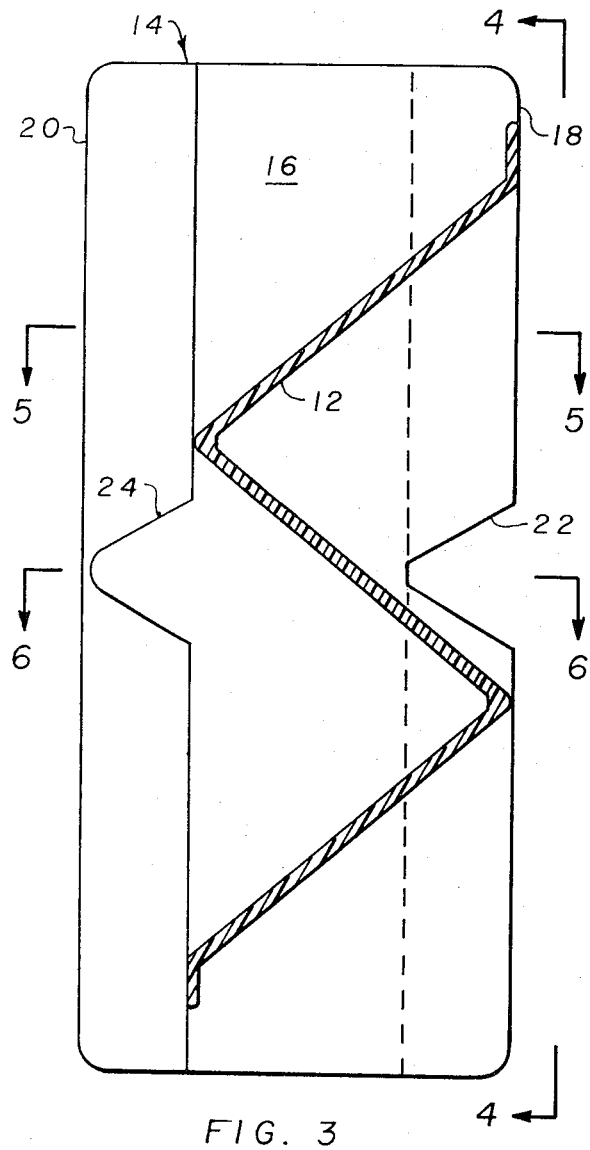
FIG. 3 is a side elevational view of the end platform of the vane of FIG. 1.
Figure 5:
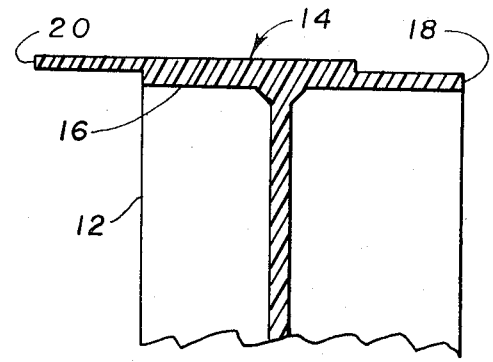
FIG. 5 is a plan view of the vane assembly along line 5—5 of FIG. 3.
Figure 6:
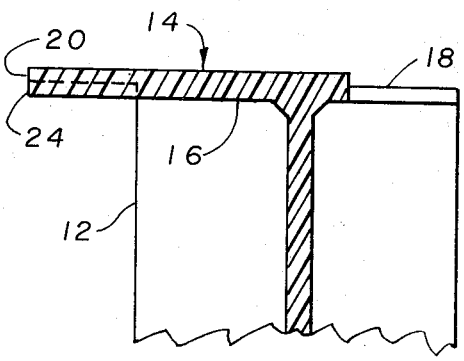
FIG. 6 is a plan view of the vane assembly along line 6—6 of FIG. 3.
Figure 4:
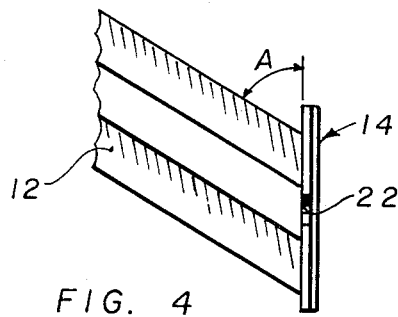
FIG. 4 is a side elevational view of the vane assembly along the lines 4—4 of FIG. 3.

Referring now to the drawings, FIG. 1 shows a demister vane assembly 10 having a demister surface to be placed transverse to the gas flow to divert the gas flow to initiate water removal. The demister surface is preferably a Z-shaped vane 12 with end platforms 14 fixed to the opposite ends of the vane 12. The end platforms have an angle A (FIG. 4) with respect to the longitudinal axis of the Z-shaped vane 12, the angle A being less than 90° and preferably approximately 60°. The vane assembly 10 is formed as an integral unit of a reinforced high temperature plastic by any suitable technique such as compression molding. The material from which the vane 10 is formed enables the vane to be utilized in a demister arrangement for a wet scrubbing system wherein because of its physical properties it will be resistant to the thermal and chemical environment found therein.

The detailed construction of the vane assembly 10 is best seen in FIGS. 3-6. The end platforms 14 forming the ends of the vane assemblies 10 have a central portion 16 which have lap joint shoulders 18 and 20 extending therefrom so as to permit interlocking of a series of vane assemblies into a particular demister arrangement. At approximately the mid point of the platform 14 along its vertical length, the lap joint shoulder 18 has a female notch 22 cut therein with a corresponding male projection 24 being formed on the lap joint shoulder 20. The female notch 22 and male projection 24 interact so as to form a self-fixturing segment upon the arrangement of the vane assemblies 10 within the demister arrangement.

With the vane assembly 10 having the above described standardized shape, it is possible to vary the demister arrangement to any desired area and geometrical configuration. FIG. 2 shows one arrangement 26 where four assemblies 10 are placed end to end so that the longitudinal axes of pairs of the assemblies are coincident. It is readily apparent that the axis of the assemblies 10 could be oriented to alternate so as to form a plural chevron type arrangement. The width of the demister arrangement is variable depending upon the particular gas flow to be scrubbed. The lap joint shoulder 18 and 20 and the self-fixturing segments 22, 24 insure accurate and secure placement of any desired number of assemblies 10. An additional advantage to the standardized assembly 10 is that replacement and inspection of any element in the total arrangement is facilitated.

From the foregoing it is apparent that there is herein provided a demister vane assembly formed in a standardized shape of reinforced plastic capable of withstanding the thermal and chemical environment of a wet scrubber system. By use of the standardized shape, various demister arrangements may be accomplished depending upon the capacity and gas flow velocity to be handled and individual elements are readily replaceable. The vane assemblies have flow diverting surfaces preferably formed as Z-shaped vanes with end platforms fixed to the vanes, the end platforms angled approximately 60° to the longitudinal axis of the vane. These end platforms have shoulders for lap joints for interlocking a series of vane assemblies and self-fixturing segments to provide accurate positioning and interlocking of the adjacent vane assemblies.

While this preferred embodiment of the invention has been shown and described, it will be understood that it is merely illustrative and that changes may be made without departing from the scope of the invention as claimed.

What is claimed is:

1. A demister vane assembly for a flue gas wet scrubber arrangement, said demister vane assembly comprising a first end platform, a gas flow diverting surface having a longitudinal axis and a transverse axis, the gas flow being substantially in the direction of said transverse axis, said flow diverting surface being joined to said first end platform so that the angle between said first end platform and said longitudinal axis is less than 90°, a second end platform, said second end platform being joined to said surface at the opposite end from said first end platform so as to be parallel with said first end platform, said first and second end platforms each having integral therewith lap joint shoulders on opposite sides of said end platforms and each having a self-fixturing assembly for connection to additional similar assemblies, said first and second end platforms and said surface being formed of reinforced plastic.

2. The apparatus of claim 1 wherein said self-fixturing assembly comprises a male projection on one lap joint shoulder and a female notch on the opposite lap joint shoulder.

3. The apparatus of claim 2 wherein said first and second end platforms and said gas flow diverting surface are formed as an integral structure.

4. The apparatus of claim 3 wherein said angle between said end platforms and said longitudinal axis of said surface is 60°.

5. The apparatus of claim 4 wherein said gas flow diverting surface is in the form of a Z-shaped vane.

6. A demister vane assembly for a products-of-combustion wet scrubber arrangement, said demister vane assembly comprising an integral flow diverting surface formed of a thermal and corrosion resistive material, said gas flow diverting surface having a Z-shaped vane with parallel end platforms integral therewith at the opposite ends thereof, said platforms being at an angle to the longitudinal axis of said Z-shaped vane other than 90°, said platforms having central portions from which lap joint shoulders extend in opposite directions and a self-fixturing means comprising a male projection on one lap joint shoulder and a female notch in the opposite lap joint shoulder.

* * * * *